United States Patent
Maxim

(10) Patent No.: US 12,244,125 B2
(45) Date of Patent: Mar. 4, 2025

(54) TRANSFER SWITCH APPARATUS

(71) Applicant: Tim Maxim, Niagara Falls (CA)

(72) Inventor: Tim Maxim, Niagara Falls (CA)

(*) Notice: Subject to any disclaimer, the term of this patent is extended or adjusted under 35 U.S.C. 154(b) by 138 days.

(21) Appl. No.: 18/210,343

(22) Filed: Jun. 15, 2023

(65) Prior Publication Data
US 2024/0421567 A1    Dec. 19, 2024

(51) Int. Cl.
| | | |
|---|---|---|
| H02B 1/04 | (2006.01) |
| H02B 1/30 | (2006.01) |
| H02J 3/00 | (2006.01) |
| H02J 9/04 | (2006.01) |

(52) U.S. Cl.
CPC ............... *H02B 1/30* (2013.01); *H02B 1/04* (2013.01); *H02J 3/007* (2020.01); *H02J 9/04* (2013.01)

(58) Field of Classification Search
CPC . H02B 1/04; H02B 1/30; H02B 1/305; H02B 1/306; H02J 3/007; H02J 9/04
See application file for complete search history.

(56) References Cited

U.S. PATENT DOCUMENTS

| | | | |
|---|---|---|---|
| 2,792,544 A * | 5/1957 | Morrill | H02P 4/00 |
| | | | 307/64 |
| 5,984,719 A | 11/1999 | Flegel | |
| 6,534,735 B1 * | 3/2003 | Czarnecki | H02B 1/066 |
| | | | 200/333 |
| 6,545,374 B1 | 4/2003 | Allenbach | |
| 7,148,585 B2 | 12/2006 | Goss | |
| 7,855,871 B2 | 12/2010 | Hudgins | |
| D662,896 S | 7/2012 | Czarnecki | |
| 8,563,883 B1 | 10/2013 | Flegel | |
| 8,784,130 B2 | 7/2014 | Scott | |
| 2017/0353025 A1 | 12/2017 | Phillips | |

FOREIGN PATENT DOCUMENTS

WO    WO2009120320    10/2009

* cited by examiner

*Primary Examiner* — Robert J Hoffberg

(57) ABSTRACT

A transfer switch apparatus for alternately connecting an electrical load to a utility power supply and a generator includes a container which houses a selector switch and an electrical receptacle. A door is coupled to the container to open and close an opening to the container to access the electrical receptacle. The door engages the selector switch to connect a utility power supply to a load when the door is closed and to connect the electrical receptacle to the load when the door is opened. An electrical plug of a generator is couplable to the electrical receptacle to power the load and to retain the door in the open position. The door is otherwise biased to close.

11 Claims, 7 Drawing Sheets

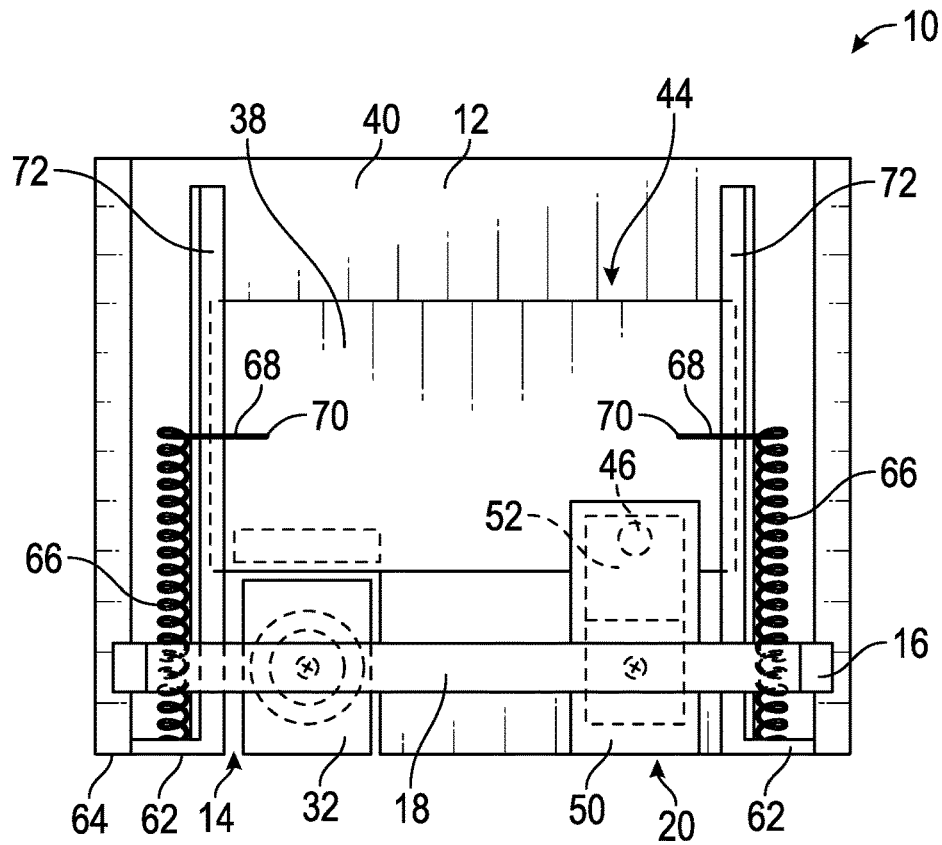
FIG. 4
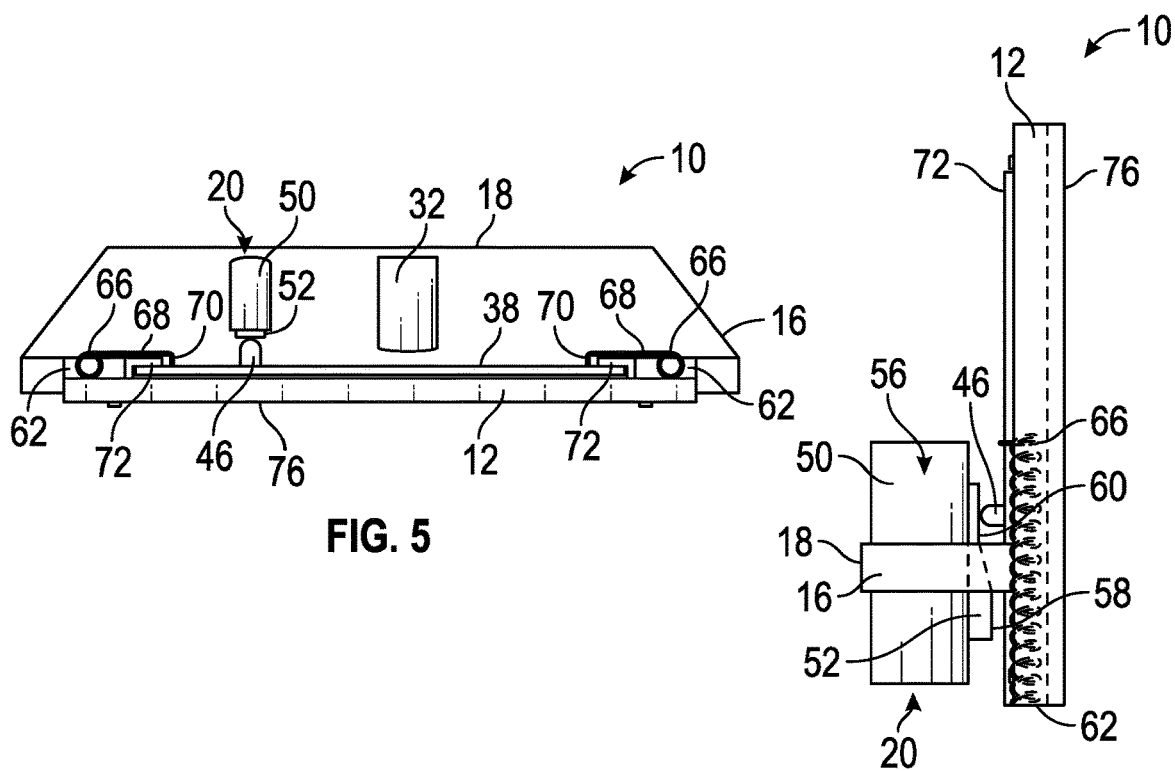
FIG. 5
FIG. 6

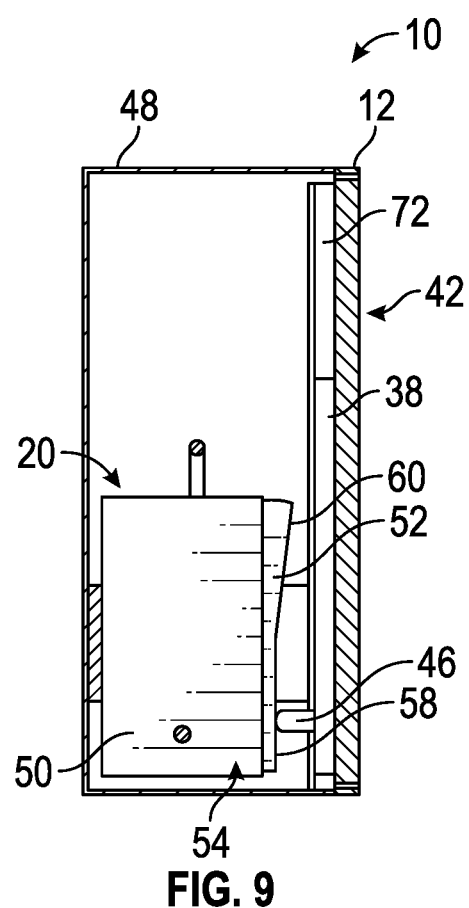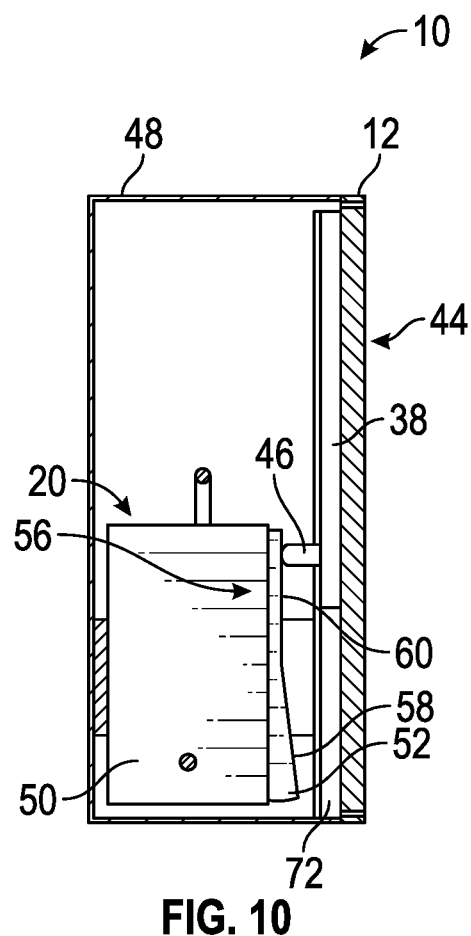

TRANSFER SWITCH APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to transfer switch apparatuses and more particularly pertains to a new transfer switch apparatus for alternately connecting an electrical load to a utility power supply and a generator.

(2) Description of Related Art Including Information Disclosed Under 37 CFR 1.97 and 1.98

The prior art provides several examples of transfer switch apparatuses for alternately connecting an electrical load to a utility power supply and a generator. For example, U.S. Pat. No. 8,563,883 discloses a transfer switch in which a cover is movable between open and closed positions to selectively access an electrical receptacle for receiving a plug of the generator. A selector switch for selecting the power source for the electrical load is also accessible only when the cover is in the open position. So, to power the electrical load with the generator, the cover must be opened, the plug is coupled to the electrical receptacle, and the selector switch is actuated.

But the prior art does not describe such a transfer switch with a door that simultaneously provides access to an electrical receptacle for connecting to a generator and actuates a selector switch when it is opened. The prior art also fails to describe such a device in which the door is biased toward a closed position, but which is retainable in the open position by an electrical plug when the electrical plug is inserted into the electrical receptacle. Such a device would be desirable in that accidental actuation of the selector switch when the generator is connected to the electrical receptacle would not occur, and operation of such a device would require fewer steps than alternatives in the prior art.

BRIEF SUMMARY OF THE INVENTION

An embodiment of the disclosure meets the needs presented above by generally comprising a panel with an opening extending therethrough. A bracket is coupled to the panel and has a mounting portion which is spaced rearwardly with respect to the panel. A selector switch is coupled to the mounting portion of the bracket and has a first power input, a second power input, and a power output. The first power input is configured to electrically connect to a utility power supply and to electrically connect to a load. The selector switch is actuatable to alternately electrically connect the first power input and the second power input to the power output. An electrical receptacle is coupled to the mounting portion of the bracket and is configured to removably electrically couple to an electrical plug of a generator. The electrical receptacle is positioned adjacent to the opening of the panel.

A door is coupled to the panel and is positioned on a rear side of the panel. The door is movable between a closed position and an open position with respect to the opening of the panel and is biased toward the closed position. The door is positioned such that the door is configured to be retained in the open position by the electrical plug of the generator when the electrical plug is electrically coupled to the electrical receptacle. A tripper is coupled to the door and is positioned to actuate the selector switch to connect the first power input to the power output when the door is closed. The tripper is positioned to actuate the selector switch to connect the second power input to the power output when the door is open.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

Figure 3:
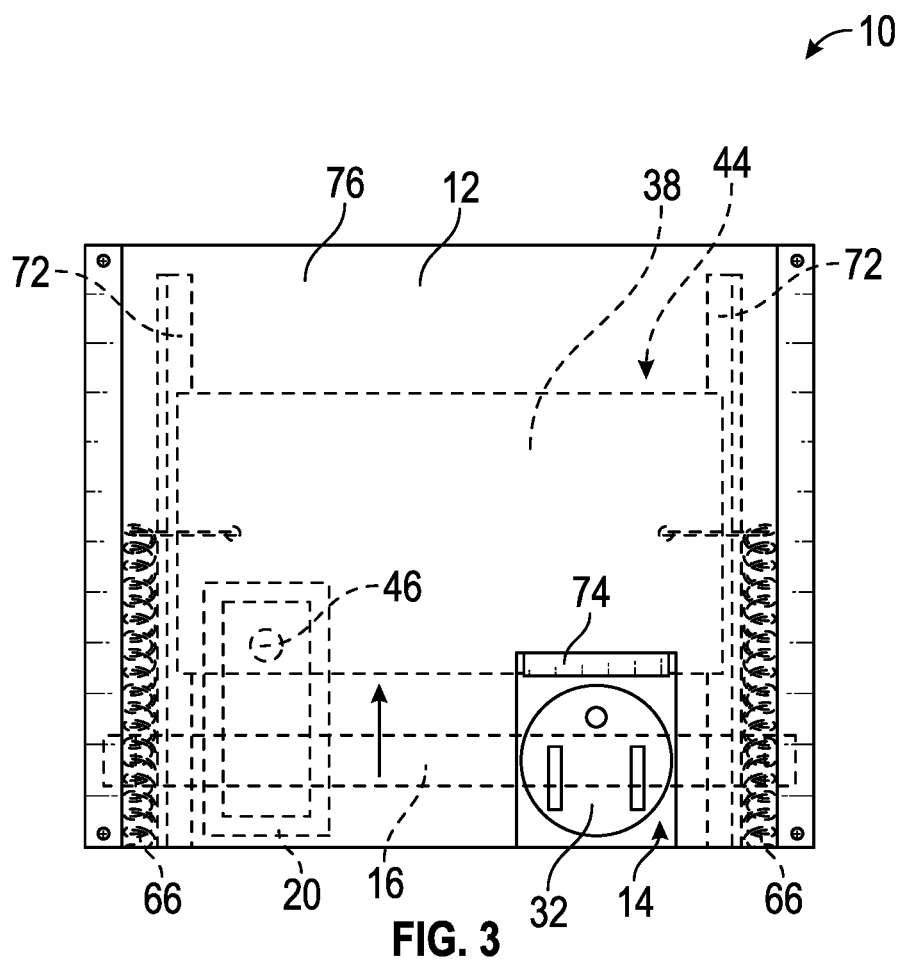
Figure 7:
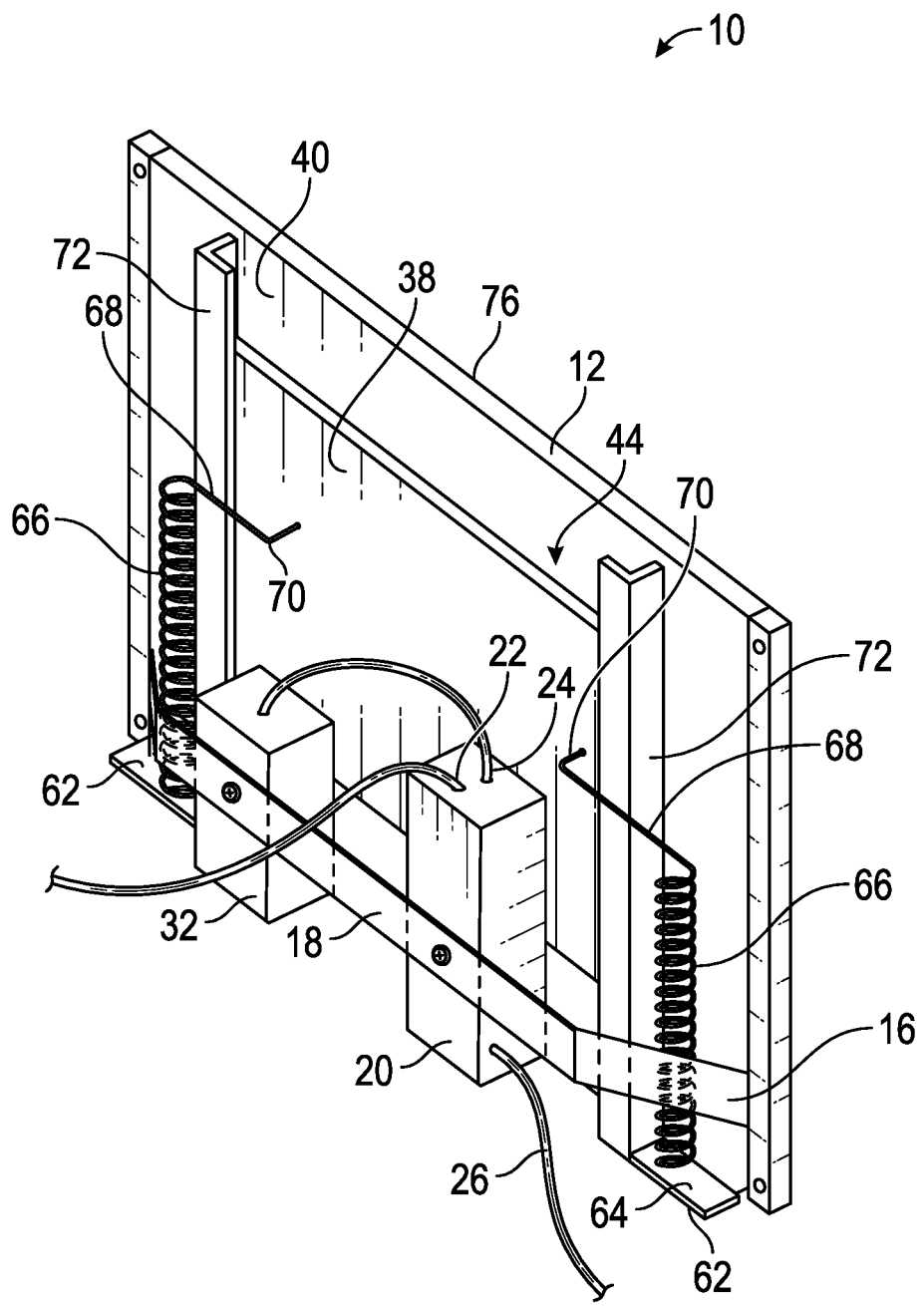

FIG. 3 is a front view of an embodiment of the disclosure.
FIG. 4 is a rear view of an embodiment of the disclosure.
FIG. 5 is a top view of an embodiment of the disclosure.
FIG. 6 is a side view of an embodiment of the disclosure.
FIG. 7 is a rear perspective view of an embodiment of the disclosure.

Figure 8:
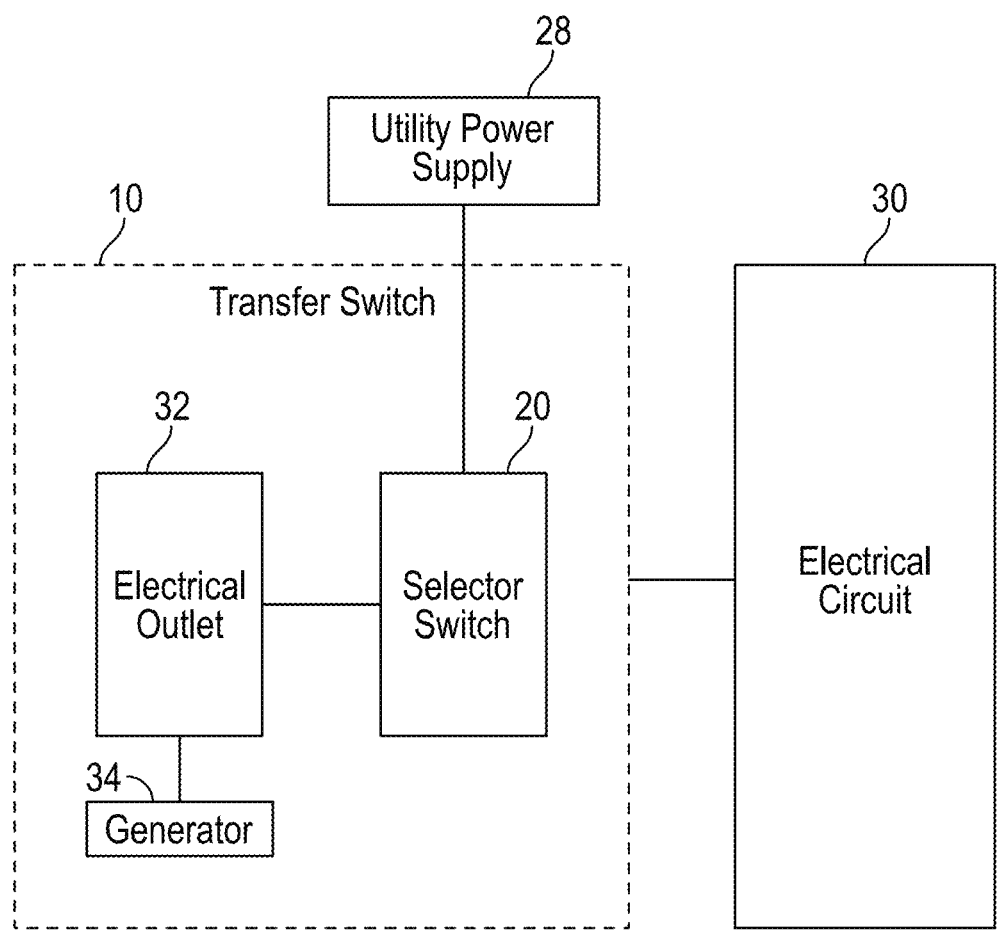

FIG. 8 is a block diagram of an embodiment of the disclosure.

Figure 1:
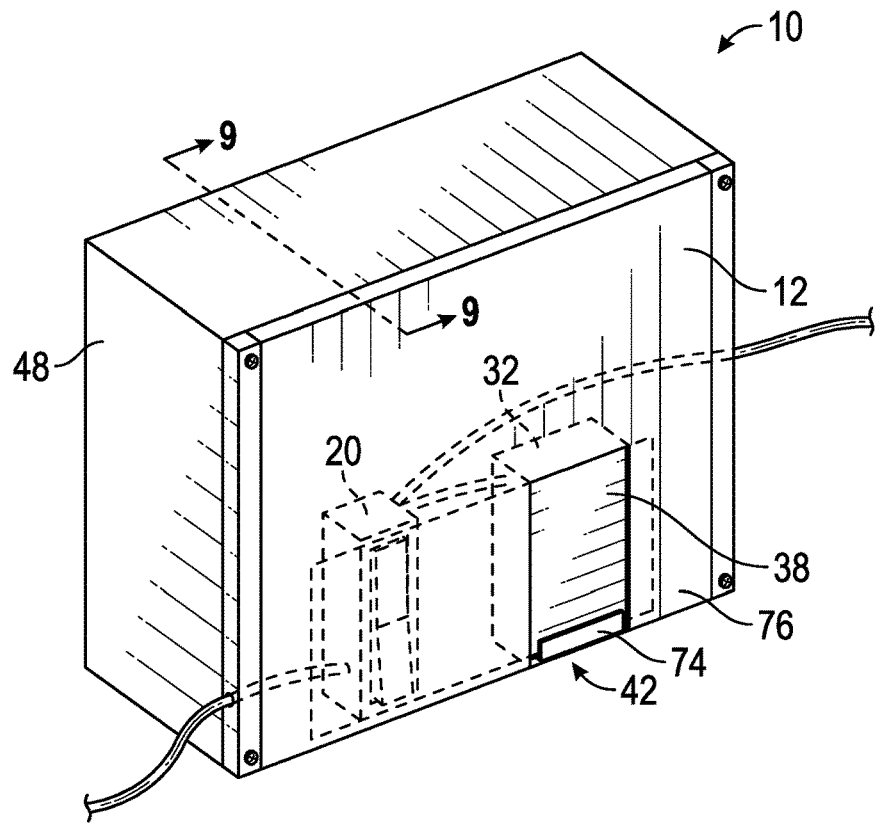
FIG. 1 is a perspective view of a transfer switch apparatus according to an embodiment of the disclosure with a door of the transfer switch in a closed position.

FIG. 9 is a cross-sectional view of an embodiment of the disclosure taken from Arrows 9-9 in FIG. 1.

Figure 2:
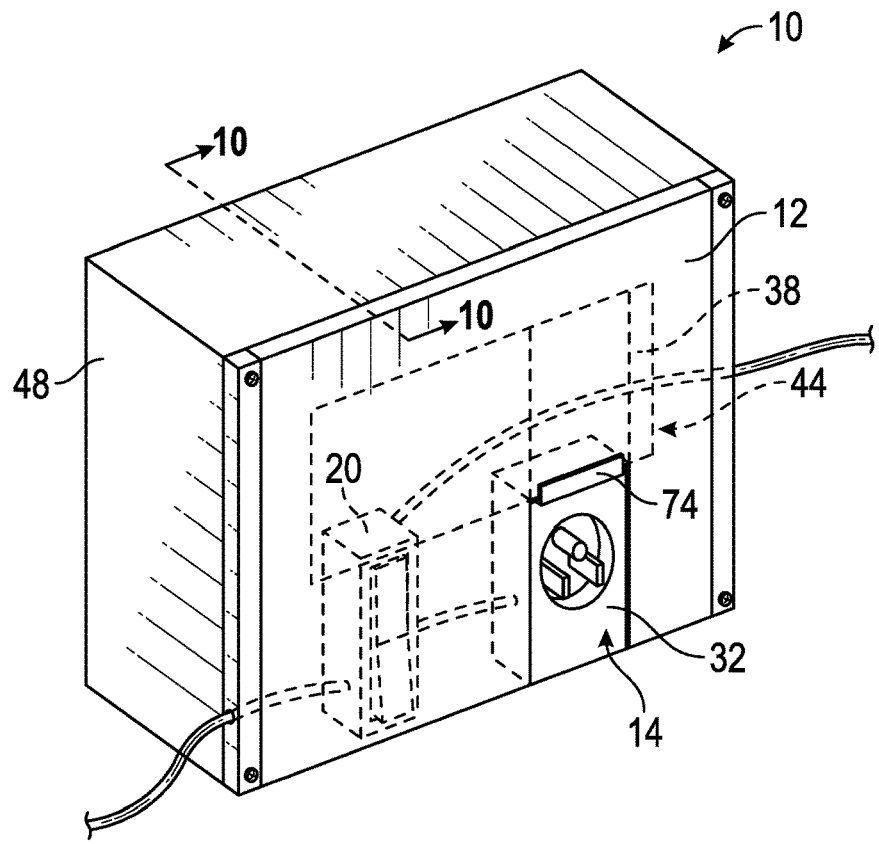
FIG. 2 is a perspective view of an embodiment of the disclosure with the door of the transfer switch in an open position.

FIG. 10 is a cross-sectional view of an embodiment of the disclosure taken from Arrows 10-10 in FIG. 2.

Figure 11:
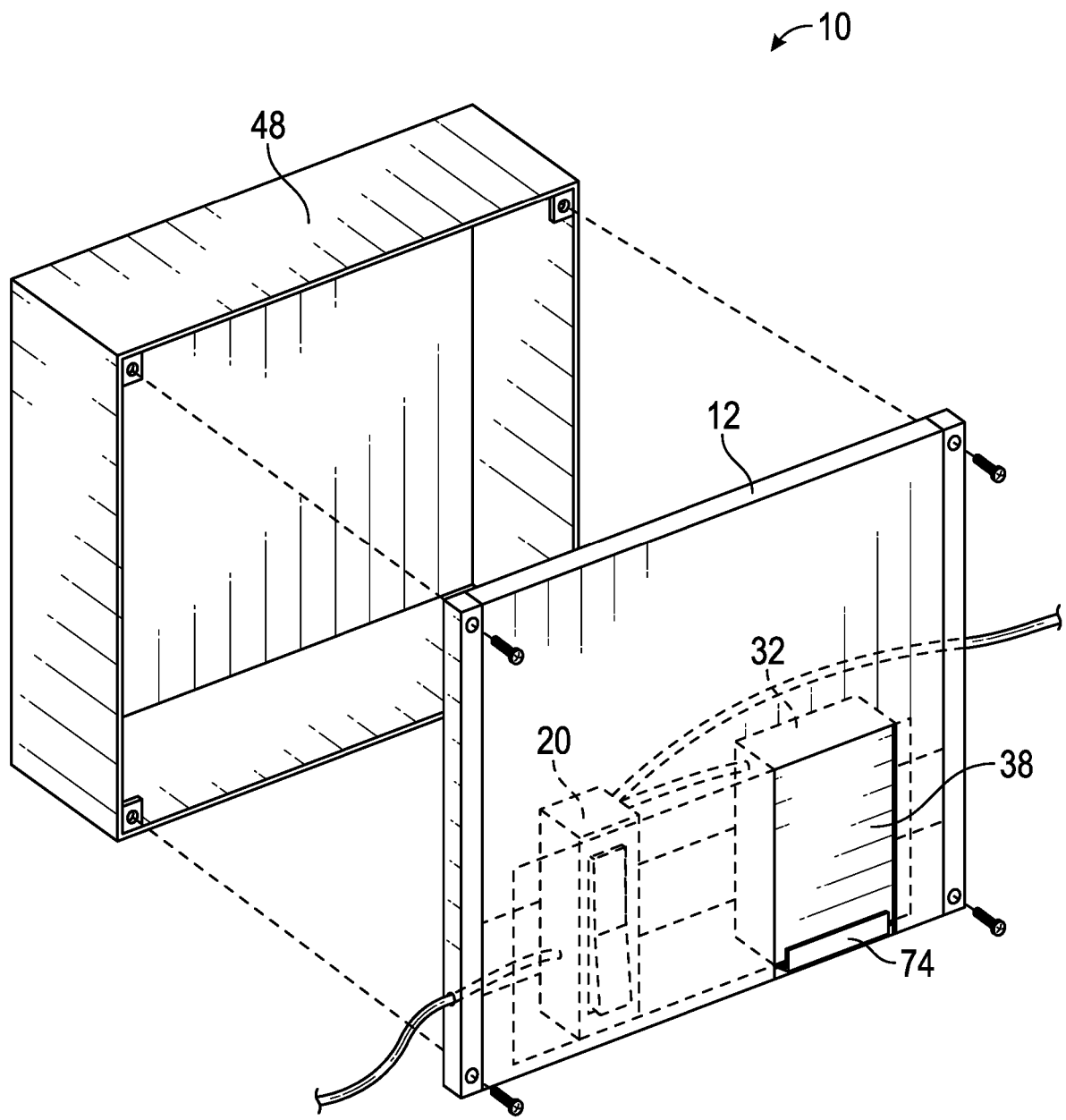

FIG. 11 is an exploded in-use perspective view of an embodiment of the disclosure.

DETAILED DESCRIPTION OF THE INVENTION

With reference now to the drawings, and in particular to FIGS. 1 through 11 thereof, a new transfer switch apparatus embodying the principles and concepts of an embodiment of the disclosure and generally designated by the reference numeral 10 will be described.

As best illustrated in FIGS. 1 through 11, the transfer switch apparatus 10 generally comprises a panel 12 with an opening 14 extending therethrough. A bracket 16 is coupled to the panel 12 and has a mounting portion 18 which is spaced rearwardly with respect to the panel 12. A selector switch 20 is coupled to the mounting portion 18 of the bracket 16. The selector switch 20 has a first power input 22, a second power input 24, and a power output 26. The first power input 22 is configured to electrically connect to a utility power supply 28, and the power output 26 is configured to electrically connect to a load 30. The selector switch 20 is actuatable to alternately electrically connect the first power input 22 and the second power input 24 to the power output 26. An electrical receptacle 32 is also coupled to the mounting portion 18 of the bracket 16. The electrical receptacle 32 is configured to removably electrically couple to an electrical plug of a generator 34 and is positioned adjacent to the opening 14 of the panel 12. The electrical receptacle 32 is a male receptacle.

A door 38 is coupled to the panel 12 and is positioned on a rear side 40 of the panel 12, the door 38 is movable between a closed position 42 and an open position 44 with respect to the opening 14 of the panel 12 and is biased toward the closed position 42. The door 38 is positioned such that the door 38 is configured to be retained in the open position 44 by the electrical plug of the generator 34 when the electrical plug is electrically coupled to the electrical receptacle 32. A tripper 46 is coupled to the door 38 and is positioned to actuate the selector switch 20 to connect the first power input 22 to the power output 26 when the door 38 is closed. The tripper 46 is positioned to actuate the selector switch 20 to connect the second power input 24 to the power output 26 when the door 38 is open. The panel 12 is mountable to an electrical box 48, a wall, or the like via threaded fasteners such that the selector switch 20 and the electrical receptacle 32 are contained in the electrical box 48, the wall, or the like. The door 38 is accessible through the opening 14 to move the door 38 between the open position 44 and the closed position 42.

The selector switch 20 comprises a main body 50 and an actuator 52. The actuator 52 is coupled to the main body 50 and is pivotable with respect to the main body 50 between a first position 54 and a second position 56. The selector switch 20 connects the first power input 22 to the power output 26 when the actuator 52 is in the first position 54 and connects the second power input 24 to the power output 26 when the actuator 52 is in the second position 56. A lower engagement surface 58 of the actuator 52 is engaged by the tripper 46 when the door 38 is in the closed position 42 to position the actuator 52 in the first position 54, and an upper engagement surface 60 of the actuator 52 is engaged by the tripper 46 when the door 38 is in the open position 44 to position the actuator 52 in the second position 56.

A pair of flanges 62 is coupled to a bottom edge 64 of the panel 12 on the rear side 40 of the panel 12. The flanges 62 of the pair of flanges 62 are positioned opposite each other across the door 38. A pair of tension springs 66 is coupled to the door 38 and the panel 12 to bias the door 38 toward the closed position 42. The door 38 is positioned between each the pair of tension springs 66. Each tension spring 66 of the pair of tension springs 66 is coupled to the panel 12 via a respective one of the pair of flanges 62. Each tension spring 66 of the pair of tension springs 66 has an extended portion 68 extending laterally with respect to the door 38 and an L-shaped portion 70 coupling the extended portion 68 to the door 38.

A pair of rails 72 is coupled to the rear side 40 of the panel 12. The door 38 engages the pair of rails 72 such that the door 38 is slidable along the pair of rails 72 between the closed position 42 and the open position 44. The door 38 is positioned between the pair of rails 72. Each rail 72 of the pair of rails 72 is L-shaped and is positioned such that the door 38 is retained between the panel 12 and a portion of each rail 72. A handle 74 is coupled to the door 38 and extends through the opening 14 to facilitate opening 14 the door 38 from a front side 76 of the panel 12.

In use, the door 38 is kept closed by the pair of tension springs 66 when it is desirable to supply power to the load 30 from the utility power supply 28 through the first power input 22 of the selector switch 20. If the utility power supply 28 experiences an outage or it is otherwise desirable to switch power sources, the door 38 is opened to actuate the selector switch 20 to disconnect the power output 26 from the first power input 22 and connect it to the second power input 24. The electrical plug is then electrically coupled to the electrical receptacle 32 so that the generator 34 may be operated to power the load 30. The electrical plug engages the door 38 to retain the door 38 in the open position 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A transfer switch apparatus comprising:
   a panel having an opening extending therethrough;
   a bracket being coupled to the panel and having a mounting portion being spaced rearwardly with respect to the panel;

a selector switch being coupled to the mounting portion of the bracket, the selector switch having a first power input, a second power input, and a power output, the first power input being configured to electrically connect to a utility power supply, the power output being configured to electrically connect to a load, and the selector switch being actuatable to alternately electrically connect the first power input and the second power input to the power output;

an electrical receptacle being coupled to the mounting portion of the bracket, the electrical receptacle being configured to removably electrically couple to an electrical plug of a generator, and the electrical receptacle being positioned adjacent to the opening of the panel;

a door being coupled to the panel and being positioned on a rear side of the panel, the door being movable between a closed position and an open position with respect to the opening of the panel, the door being biased toward the closed position, the door covering the electrical receptacle preventing the electrical plug of the generator from being inserted into the electrical receptacle when the door is in the closed position, and the door being positioned such that the door is configured to be retained in the open position by the electrical plug of the generator when the electrical plug is electrically coupled to the electrical receptacle; and a tripper being coupled to the door, the tripper being positioned to actuate the selector switch to connect the first power input to the power output when the door is in the closed position, and the tripper being positioned to actuate the selector switch to connect the second power input to the power output when the door is in the open position.

2. The apparatus of claim 1, wherein the electrical receptacle is a male receptacle.

3. The apparatus of claim 1, wherein the selector switch comprises a main body and an actuator, the actuator being coupled to the main body and being pivotable with respect to the main body between a first position and a second position, the selector switch connecting the first power input to the power output when the actuator is in the first position, and the selector switch connecting the second power input to the power output when the actuator is in the second position.

4. The apparatus of claim 3, wherein a lower engagement surface of the actuator is engaged by the tripper when the door is in the closed position to position the actuator in the first position, and an upper engagement surface of the actuator being engaged by the tripper when the door is in the open position to position the actuator in the second position.

5. The apparatus of claim 1, further comprising a pair of tension springs being coupled to the door and the panel to bias the door toward the closed position, the door being positioned between the pair of tension springs.

6. The apparatus of claim 5, further comprising a pair of flanges being coupled to a bottom edge of the panel on the rear side of the panel, the pair of flanges being positioned opposite each other across the door, and each tension spring of the pair of tension springs being coupled to the door and a respective one of the pair of flanges.

7. The apparatus of claim 6, wherein each tension spring of the pair of tension springs has an extended portion extending laterally with respect to the door and an L-shaped portion coupling the extended portion to the door.

8. The apparatus of claim 1, further comprising a pair of rails being coupled to the rear side of the panel, the door engaging the pair of rails such that the door is slidable along the pair of rails between the closed position and the open position.

9. The apparatus of claim 8, wherein the door is positioned between the pair of rails, each rail of the pair of rails being L-shaped and being positioned such that the door is retained between the panel and a portion of each rail.

10. The apparatus of claim 1, further comprising a handle being coupled to the door and extending through the opening to facilitate opening the door from a front side of the panel.

11. A transfer switch apparatus comprising:

a panel having an opening extending therethrough;

a bracket being coupled to the panel and having a mounting portion being spaced rearwardly with respect to the panel;

a selector switch being coupled to the mounting portion of the bracket, the selector switch having a first power input, a second power input, and a power output, the first power input being configured to electrically connect to a utility power supply, the power output being configured to electrically connect to a load, and the selector switch being actuatable to alternately electrically connect the first power input and the second power input to the power output;

an electrical receptacle being coupled to the mounting portion of the bracket, the electrical receptacle being configured to removably electrically couple to an electrical plug of a generator, the electrical receptacle being positioned adjacent to the opening of the panel, and the electrical receptacle being a male receptacle;

a door being coupled to the panel and being positioned on a rear side of the panel, the door being movable between a closed position and an open position with respect to the opening of the panel, the door being biased toward the closed position, the door covering the electrical receptacle preventing the electrical plug of the generator from being inserted into the electrical receptacle when the door is in the closed position, and the door being positioned such that the door is configured to be retained in the open position by the electrical plug of the generator when the electrical plug is electrically coupled to the electrical receptacle;

a tripper being coupled to the door, the tripper being positioned to actuate the selector switch to connect the first power input to the power output when the door is in the closed position, and the tripper being positioned to actuate the selector switch to connect the second power input to the power output when the door is in the open position;

wherein the selector switch comprises a main body and an actuator, the actuator being coupled to the main body and being pivotable with respect to the main body between a first position and a second position, the selector switch connecting the first power input to the power output when the actuator is in the first position, the selector switch connecting the second power input to the power output when the actuator is in the second position, a lower engagement surface of the actuator being engaged by the tripper when the door is in the closed position to position the actuator in the first position, and an upper engagement surface of the actuator being engaged by the tripper when the door is in the open position to position the actuator in the second position;

a pair of flanges being coupled to a bottom edge of the panel on the rear side of the panel, the pair of flanges being positioned opposite each other across the door;

a pair of tension springs being coupled to the door and the panel to bias the door toward the closed position, the door being positioned between the pair of tension springs, each tension spring of the pair of tension springs being coupled to a respective one of the pair of flanges, and each tension spring of the pair of tension springs having an extended portion extending laterally with respect to the door and an L-shaped portion coupling the extended portion to the door;

a pair of rails being coupled to the rear side of the panel, the door engaging the pair of rails such that the door is slidable along the pair of rails between the closed position and the open position, the door being positioned between the pair of rails, and each rail of the pair of rails being L-shaped and being positioned such that the door is retained between the panel and a portion of each rail; and a handle being coupled to the door and extending through the opening to facilitate opening the door from a front side of the panel.

* * * * *